United States Patent [19]

Kameda et al.

[11] Patent Number: 5,472,221
[45] Date of Patent: Dec. 5, 1995

[54] BICYCLE WHEEL FORK ASSEMBLY

[75] Inventors: Hirokatsu Kameda; Toshio Ohma, both of Shizuoka, Japan

[73] Assignee: Showa Corporation, Gyoda, Japan

[21] Appl. No.: 209,975

[22] Filed: Mar. 11, 1994

[30] Foreign Application Priority Data

Mar. 18, 1993 [JP] Japan .................................. 5-082467

[51] Int. Cl.⁶ .................................................. B62K 25/08
[52] U.S. Cl. ...................... 280/276; 188/24.11; 188/24.12
[58] Field of Search ..................................... 280/276, 275, 280/277, 278, 283; 188/280, 24.11, 24.12

[56] References Cited

U.S. PATENT DOCUMENTS 4,971,344 11/1990 Turner .

FOREIGN PATENT DOCUMENTS

| 245221 | 11/1987 | European Pat. Off. ................ 280/276 |
| 65155 | 9/1955 | France .................................... 280/276 |
| 426888 | 11/1947 | Italy ........................................ 280/276 |
| 636282 | 4/1950 | United Kingdom ................... 280/277 |

*Primary Examiner*—Mitchell J. Hill
*Attorney, Agent, or Firm*—Dvorak and Traub

[57] ABSTRACT

A bicycle front fork is disclosed, in which paired front fork assemblies capable of being elongated and contracted are coupled together at their upper ends by a cross member each lower end provided with an axle support for supporting an axle, the axle supports each having a support surface perpendicular to the axis of the axle. Each front fork assembly has a cross member holder having a mounting surface, which is perpendicular to the support surface of each axle support. The cross member is mounted by holding its outer surface in contact with the mounting surfaces and inserting mounting bolts in a direction parallel to the axle.

3 Claims, 3 Drawing Sheets

BICYCLE WHEEL FORK ASSEMBLY

FIELD OF THE INVENTION

The present invention relates to a cross member mounting structure for a bicycle suspension.

BACKGROUND OF THE INVENTION

Prior art off-road bicycles include one in which the front wheel is supported by a front fork provided with a buffering mechanism and an attenuating mechanism. FIG. 4 is a front fork, similar to that discussed in U.S. Pat. No. 4,971,344 comprising two front fork assemblies 1, each having an inner and an outer tube 2 and 3 which are slidable relative to each other. The inner tubes 2 of the front fork assemblies 1 have their upper end coupled to a steering bracket 4. The outer tubes 3 are coupled by mounting bolts 9 to a cross member 5, each having their lower end formed with an axle support 6 for supporting the axle.

The axle supports 6 each have a support surface, which is perpendicular to the axis 7 of the axle (i.e., perpendicular to the plane of paper of FIG. 4). Each outer tube 3 has a cross member mounting portion 8, which has a mounting surface extending parallel to the axis 7 of the axle (i.e., parallel to the plane of paper of FIG. 4). This means that the directions of a cutting tool for machining the support surface of the axle support 6 and that for machining the mounting surface of the cross member mounting portion 8 differ by 90 degrees. Therefore, the direction of the cutting tool has to be changed for machining the support and mounting surfaces.

During steering, the front fork assemblies 1 receive twisting forces F exerted from the front wheel axle. These twisting forces F are supported by the cross member 5. The twisting forces F act in a direction parallel to the axis 7 of the axle (i.e., parallel to the plane of paper of FIG. 4), and are supported by the sections of the mounting bolts 9 perpendicular to the axis thereof.

Further, where a brake lever (not shown) is coupled to the cross member 5, brake reaction forces N are applied to the cross member 5 at the time of a braking operation. These braking reaction forces N are applied in the direction of insertion of the mounting bolts 9 (i.e., direction perpendicular to the plane of paper of FIG. 4). That is, they are supported by the head of each mounting bolt 9 having a small support area. Therefore, with the prior art cross member 5 mounting structure, the mechanical strength is relatively low with respect to the twisting and brake reaction forces F and N, and the rigidity is insufficient.

DISCLOSURE OF THE INVENTION

The present invention contemplates the above drawbacks inherent in the prior art. Its object is to provide a cross member mounting structure for an off-road bicycle, which permits improvement of the efficiency of machining the cross member mounting portions while improving the rigidity of the cross member mounting structure.

According to the present invention, there is provided paired fork assemblies capable of being elongated and contracted, coupled together at the upper ends by a cross member, and each having the lower ends provided with an axle support for supporting an axle. The axle supports each have a support surface perpendicular to the axle, and a cross member mounting structure for the bicycle suspension. Each of the fork assemblies has a cross member mounting section having a mounting surface parallel to the support surface of each axle support, the cross member being mounted by holding the side surface thereof in contact with the mounting surfaces and inserting mounting bolts in a direction parallel to the axle.

In the cross member mounting structure for the off-road bicycle according to the invention, the mounting surfaces of the cross member mounting sections are formed to be parallel with the support surfaces of the axle supports. Thus, after the support surfaces have been machined, the mounting surfaces can be machined without changing the direction of the same cutting tool. It is thus possible to simplify the processes of machining the support and mounting surfaces and permit improvement of the efficiency of machining the cross member mounting portions.

Twisting forces act on the cross member in the direction of the axle from the fork assemblies. According to the invention, the cross member is mounted in the cross member mounting sections by holding its side surface in contact with the mounting surfaces of the cross member mounting sections and inserting bolts in a direction parallel to the axle direction. Thus, the twisting forces can be supported not only by the mounting bolts but also by the mounting surfaces of the cross member mounting sections. It is thus possible to improve the rigidity of the cross member mounting structure.

BRIEF DESCRIPTION OF THE DRAWINGS

The present invention will be more fully understood from the detailed description given below and from the accompanying drawings which should not be taken to be a limitation on the invention, but for explanation and understanding only.

The drawings.

DETAILED DESCRIPTION OF THE PREFERRED EMBODIMENT

An embodiment of the invention will be described with reference to the drawings.

Figure 1:
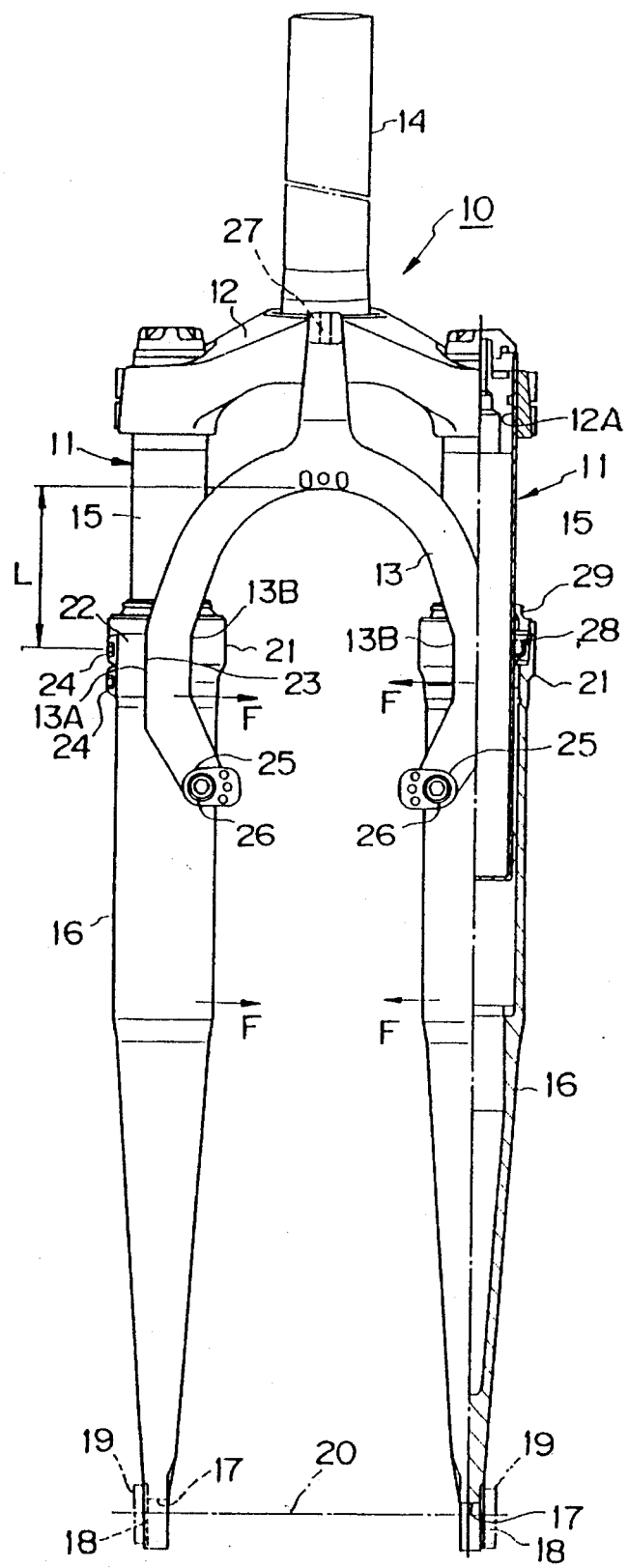
FIG. 1 is a front view showing a bicycle front fork, to which is applied an embodiment of the cross member mounting structure for a bicycle suspension according to the invention.

FIG. 1 is a front view showing a bicycle front fork, to which is applied an embodiment of the cross member mounting structure for a bicycle suspension according to the invention.

As shown in FIG. 1, a front fork, generally designated at 10, of a front wheel suspension comprises two front fork assemblies 11 which are coupled together by a steering bracket 12 and a cross member 13. The lower end of each front fork assembly 11 supports the axle of the front wheel (not shown). The steering bracket 12 has a steering shaft 14, which is supported rotatably on a head pipe (not shown) of the bicycle frame for steering. A handle bar (not shown) is secured to the upper end of the steering shaft 14.

Each of the front fork assemblies 11 includes an inner and an outer tube 15 and 16, these tubes being slidably coupled together for elongation and contraction. The lower end of the outer tube 16 has an axle support section 17 which supports the axle of the front wheel. The inner tube 15 is coupled to the steering bracket 12 with its upper end inserted in a hole 12A in the steering bracket 12 and is secured to the same by a bolt. The axle support section 17 has a support surface 18 which is formed by machining. A washer 19 is held in contact with the support surface 18. The accuracy of seating of the washer 19 is thus improved. The support surface 18 extends perpendicular to the axis 20 of the axle.

The inner and outer tubes 15 and 16 include built-in buffering and attenuating mechanisms (not shown). The front fork assemblies 11 are thus elongated and contracted by impact forces exerted to the axle support sections 17 from the front wheel. The buffering mechanisms absorb impact forces, and the attenuating mechanisms suppress the elongating and contracting motions to suppress vibrations.

Figure 2:
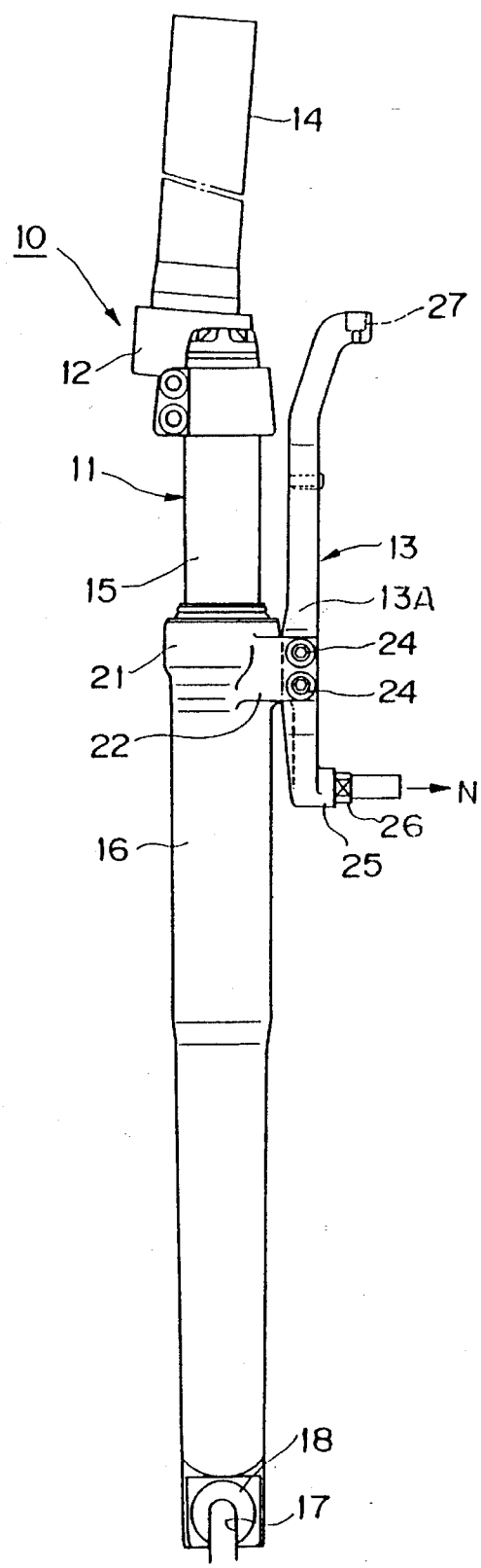
FIG. 2 is a side view showing the bicycle front fork shown in FIG. 1.
Figure 3:
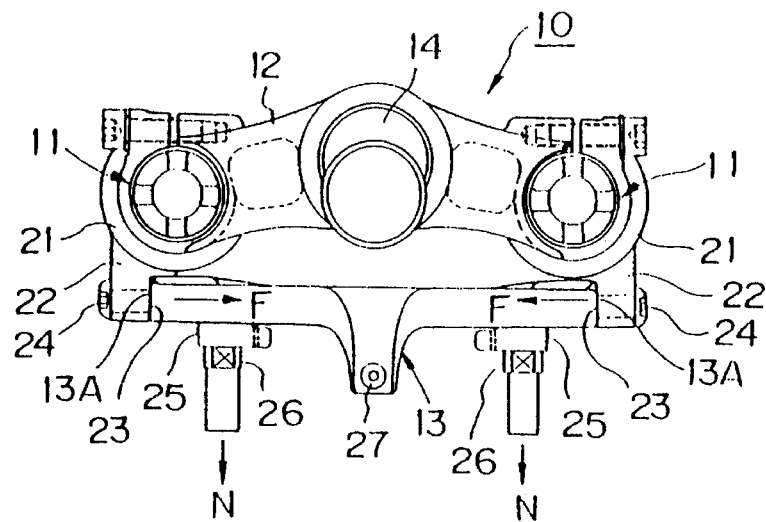
FIG. 3 is a plan view showing the bicycle front fork shown in FIG. 1.

The outer tube 16 has an increased diameter portion 21 formed at the upper end. In the increased diameter portion 21, an oil seal 28 and a dust seal 29 are accommodated to provide a seal between the inner and outer tubes 15 and 16. As shown in FIGS. 2 and 3, a lower portion of the increased diameter portion 21 has an integral cross member holder 22 serving as a cross member mounting section. The cross member holder 22 extends toward the cross member 13, and its mounting surface 23 is parallel to the support surface 18 of the axle support 17. The mounting surface 23, like the support surface 18, is machined to provide for satisfactory accuracy of mounting.

The cross member 13 is U-shaped, and is mounted in each cross member holder 22 by holding its side or outer surface 13A in contact with the mounting surface 23 of the cross member holder 22, and inserting mounting bolts 24 from the outer side in a direction parallel to the axis 20 of the axle. The cross member 13 serves to make up for insufficient rigidity due to the fact that the front fork assembly 11 comprises two divisions, i.e., the inner and outer tubes 15 and 16.

Each of the opposite lower ends of the cross member 13 has an integral brake mounting boss 25 which supports a brake holder 26. These brake holders 26 each rotatably support a brake lever (not shown) having a brake pad (not shown). The cross member 13 has its top formed with a brake wire insertion section 27.

In this embodiment, the mounting surfaces 23 of the cross member holders 22 are formed such that they are parallel with the support surfaces 18 of the axle supports 17. Thus, after machining the support surfaces 18, the mounting surfaces 23 can be machined without changing the direction of the same cutting tool (not shown). Thus, it is possible to simplify the processes of machining the support and mounting surfaces 18 and 23 and improve the efficiency of machining the cross member holder 22. In addition, since the support and mounting surfaces 18 and 23 can be machined with the same standards, their machining accuracy can be improved.

When steering the bicycle, twisting forces F are generally applied to the front fork assemblies 11 of the front fork 10 from the front wheel axle. These twisting forces F are supported by the cross member 13. When braking the bicycle, brake reaction forces N are transmitted to the cross member 13 via the brake bars and brake holders 26. The twisting forces F are exerted in the direction of the axis 20 of the axle as shown in FIGS. 1 and 3, and the brake reaction forces N are exerted in the axial direction of the brake holders 26 as shown in FIG. 2. In this embodiment, the cross member 13 is mounted by holding its outer surface 13A in contact with the mounting surfaces 23 of the cross member holders 22 that extend perpendicular to the axis 20 of the axle and inserting the mounting bolts 24 in a direction parallel to the axis 20 of the axle. Thus, the twisting forces F, unlike the prior art example (FIG. 4), are not supported by the section of the mounting bolts 9 perpendicular to the axis thereof, but instead are supported by the mounting surfaces 23 of the cross member holders 22 as well as by the mounting bolts 24. Also, the brake reaction forces N, unlike the prior art example (FIG. 4), are not supported by the heads of the bolts 9 but are supported by the section thereof perpendicular to the axis thereof. Thus, the structure for mounting the cross member 13 in this embodiment has sufficient mechanical strength with respect to the twisting and brake reaction forces F and N. It is thus possible to improve the rigidity of the structure.

Figure 4:
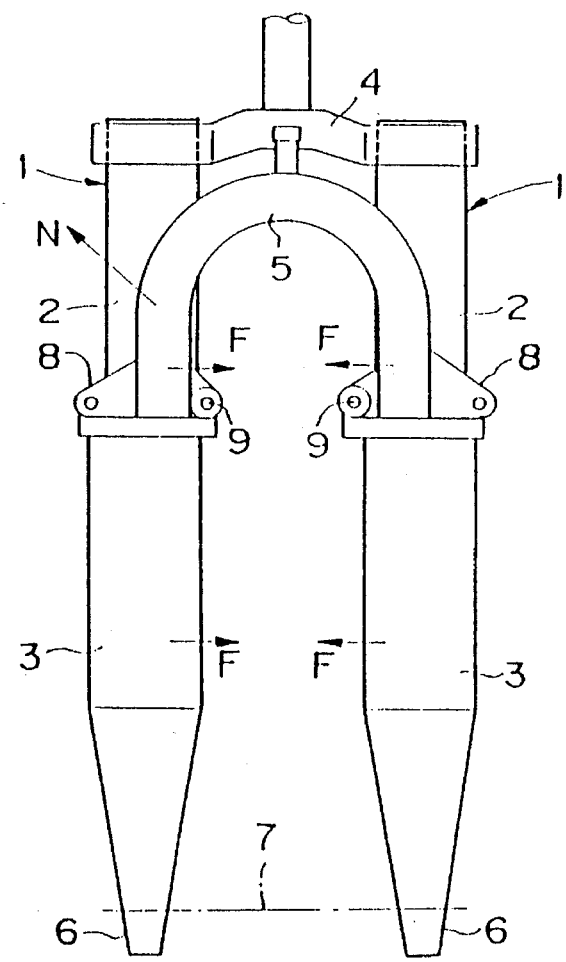
FIG. 4 is a front view showing a prior art bicycle front fork.

In the prior art example shown in FIG. 4, the make-up length of the mounting bolt 9 is determined by the extent of projection of the cross member mounting section 8 of each outer tube 3 toward the cross member 5. This extent of projection is dependent on the brake bar mounting position. Therefore, sometimes the make-up length of the mounting bolt 9 is insufficient. In contrast, in this embodiment, as shown in FIGS. 1 and 3, the mounting bolt 24 is inserted in a direction parallel to the axis 20 of the axle. Thus, it is possible to ensure sufficient make-up length of the mounting bolt 24 and permit improvement of the mounting strength of the cross member 13. In addition, the extent of projection of the cross member holders 22 toward the cross member 13 can be set by taking the sole brake lever mounting position into consideration.

Further, since the mounting bolt 24 is inserted through the cross member holder 22 and cross member 13 in a direction parallel to the axis 20 of the axle, it is possible to set the position of mounting of the cross member 22 to the position of the increased diameter portion 21 of the outer tube 16, in which the oil seal 28 and dust seal 29 are accommodated. Thus, in the cross member 13, the distance L from its position of mounting in the cross member holder 22 to its top may be reduced, thereby improving the rigidity of the cross member 13.

Further, since the cross member 13 has the integral brake mounting bosses 25, compared to the case in which the outer tubes 16 are formed with integral brake mounting bosses 25, the machining of the outer tubes can be facilitated to reduce manufacturing cost.

Further, the front of the cross member 13 is flat and free from any head of mounting bolt 24, the brake wire inserted through the brake wire inserting section 27 and the wire mounting section will not interfere with the heads of the mounting bolts 24.

Further, while in the above embodiment the outer surface 13A of the cross member 13 is held in contact with the mounting surfaces 23 of the cross member holders 22, it is also possible to have the inner surface 13B of the cross member 13 in contact with the cross member mounting surfaces.

As has been described in the foregoing, with the cross member mounting structure for a bicycle suspension according to the invention, it is possible to improve the efficiency of machining the cross member mounting sections and also improve the rigidity of the cross member mounting structure.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above but to include all possible embodiments which can be embodied within a scope encompassed and equivalents thereof with respect to the feature set out in the appended claims.

What is claimed is:

1. A bicycle wheel fork assembly, comprising:

a first inner tube slidably coupled to a first outer tube, wherein the first inner and outer tubes are capable of being elongated and contracted, the first outer tube having a lower portion with an axle support surface for supporting an axle having an axis perpendicular to the axle support surface;

a second inner tube slidably coupled to a second outer tube, wherein the second inner and outer tubes are capable of being elongated and contracted, the second outer tube having a lower portion with an axle support surface for supporting an axle having an axis perpendicular to the axle support surface;

a cross member coupled to an upper portion of the first and second outer tubes, the cross member having opposing side surfaces and opposing lower end portions, the upper portion of the first and second outer tubes each having a cross member holder with a mounting surface, the mounting surface substantially parallel to the axle support surfaces side surface of the cross member contacting the mounting surface of one of the cross member holders;

a corresponding mounting member extending through each mounting surface of the cross member holder and into the side surface of the cross member to secure the cross member to the outer tube, wherein an axis of the mounting member is substantially parallel to the axis of the axle; and a brake mounting boss disposed on each of the opposing lower end portions of the cross member.

2. A bicycle wheel fork assembly according to claim 1, wherein the brake mounting boss is integral with the cross member, and the brake mounting boss is arranged to support a brake holder substantially perpendicular to the axis of the axle.

3. A bicycle wheel fork assembly according to claim 1, wherein the cross member is an inverted U-shaped member, and wherein the opposing side surfaces are on opposing sides of the inverted U-shaped member, each brake mounting boss disposed on the lower end portions of the inverted U-shaped member for supporting a brake holder substantially perpendicular to the axis of the mounting bolts.

* * * * *